United States Patent [19]
Logerquist

[11] 3,711,110
[45] Jan. 16, 1973

[54] TRUCK FOR TOOL BOX

[76] Inventor: John R. Logerquist, 2088 Fry Street, St. Paul, Minn.

[22] Filed: Feb. 18, 1971

[21] Appl. No.: 116,540

[52] U.S. Cl. ............................... 280/43.24, 280/37
[51] Int. Cl. .............................................. B62d 21/18
[58] Field of Search .280/36 C, 36 R, 38, 41 R, 41 C, 280/37, 43, 43.1, 43.24, 47.13, 47.17, 47.18, 47.21, 47.24, 47.26; 190/18 R, 18 A

[56] References Cited

UNITED STATES PATENTS

| | | | |
|---|---|---|---|
| 1,255,484 | 2/1918 | Stephens | 280/47.24 X |
| 1,100,702 | 6/1914 | Holmes | 280/43.24 |
| 1,715,865 | 6/1929 | Rosenfeld | 280/35 |
| 3,071,387 | 1/1963 | Beaman et al. | 280/47.24 |
| 2,433,356 | 12/1947 | French | 280/43.24 |
| 3,118,685 | 1/1964 | Jordan | 280/47.19 |
| 1,808,864 | 6/1931 | Pinheiro | 190/18 A X |
| 2,668,061 | 2/1954 | Kuda | 280/41 R X |
| 2,712,869 | 7/1955 | Belt | 280/43.24 |
| 3,403,923 | 10/1968 | Mouchet | 280/43.1 |

FOREIGN PATENTS OR APPLICATIONS

| | | | |
|---|---|---|---|
| 71,864 | 3/1947 | Norway | 280/36 C |

*Primary Examiner*—Leo Friaglia
*Assistant Examiner*—Robert R. Song
*Attorney*—Burd, Braddock & Bartz

[57] ABSTRACT

A two-wheel truck movably mounted on a tool box to selectively support the tool box on a supporting surface and facilitate movement of the tool box over the surface. The truck has side frame members pivotally connected to the sides of the box. Wheels are rotatably mounted on the lower end of the frame members.

6 Claims, 5 Drawing Figures

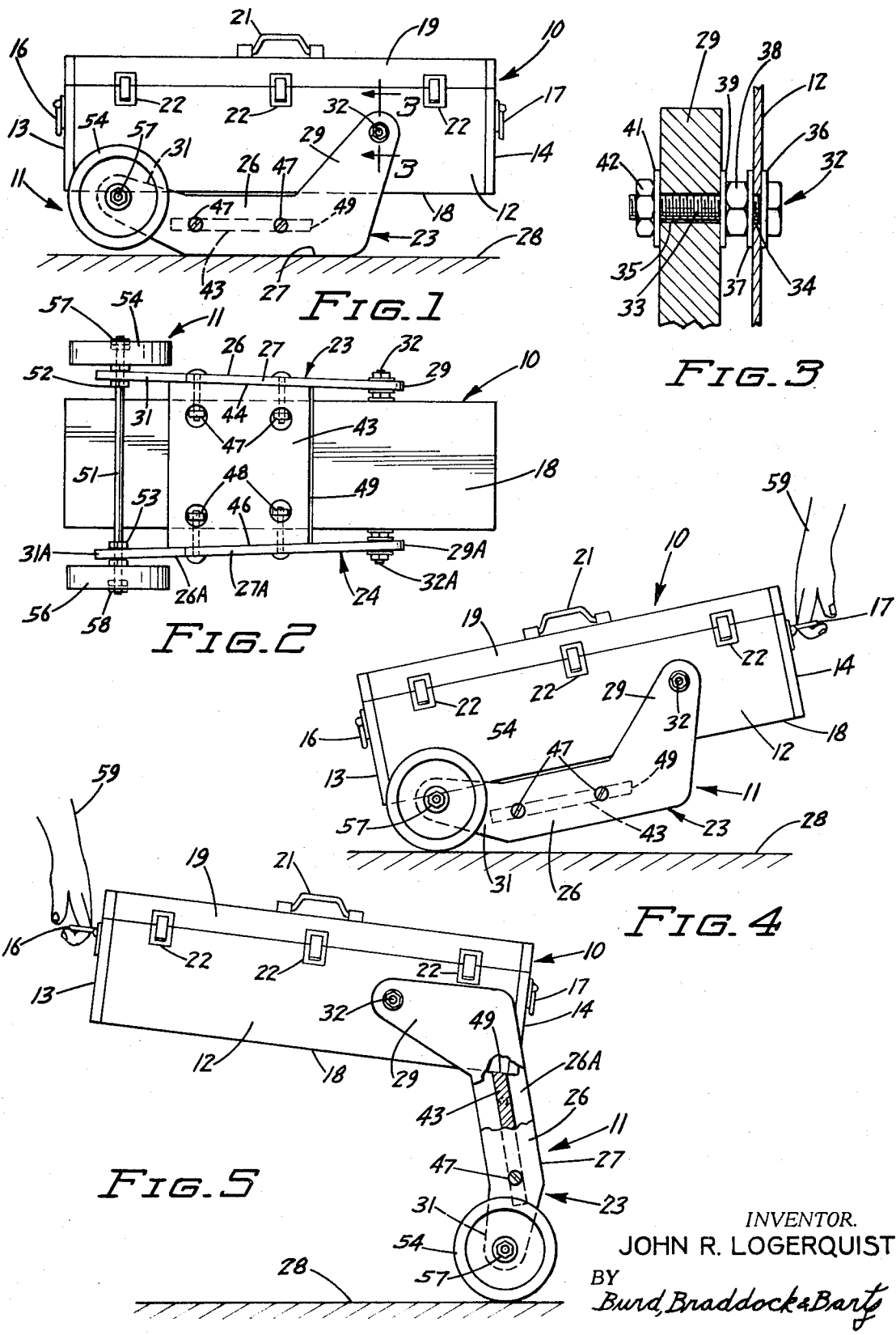

TRUCK FOR TOOL BOX

BACKGROUND OF INVENTION

Numerous carriers, trucks and devices have been developed to facilitate the movement of objects. These devices are usually provided with wheels, rollers, skids and like structures to reduce friction and effort in moving the object. The two-wheel hand truck commonly used to transport objects, as containers, bags and boxes, is an example of one of these devices. Other types of trucks for carrying suitcases, handbags and satchels are disclosed by Roberts in U.S. Pat. No. 362,868 and Rosenfeldt in U.S. Pat. No. 1,715,865.

The Rosenfeldt device has a casing with a slotted bottom to provide openings for legs. The legs are pivotally connected to the side of the casing. Wheels are rotatably mounted on the lower ends of the legs. The wheels and legs can be moved up into the casing and are retained there with latches. The wheels and legs are only used in one position to facilitate the moving and supporting of the casing.

Tradesmen, as carpenters, plumbers, electricians and the like, use numerous hand tools which are usually stored in a tool box or tool chest. The tool box must be transported to each job site as it is used on the job. As the job progresses, the tool box is frequently moved so that it is always in a convenient location. Each day the tradesman returns his tool box to either his vehicle or storage location. Trucks and other types of carrying devices have been used with tool boxes as they are heavy and difficult to carry. These devices use wheels connected to the tool chest. Schreffler in U.S. Pat. No. 832,628 and Jordan in U.S. Pat. No. 3,118,685 disclose examples of tool chests having wheels to reduce the effort required to transport the chests.

An object of the invention is to provide a wheeled truck for a conventional tool box that can firmly support the tool box in a fixed location and be used to transport the tool box with a minimum of effort. Another object of the invention is to provide a truck having wheels used with an object to selectively support the object and facilitate the movement of the object. A further object of the invention is to provide a truck for tool box that is relatively low in cost, compact in construction, usable with various size tool boxes, and is convenient to assemble and use.

SUMMARY OF INVENTION

The invention relates to a carrier or wheeled truck usable to facilitate movement of an object over a supporting surface. More particularly, the wheeled truck is connected to a container, as a tool box, to selectively support the box on a supporting surface and to facilitate movement of the tool box from location to location. The truck has first and second members for carrying the wheel means. Portions of the first member and the second member are movably mounted on the container. The first member and second member have support portions which engage the supporting surface when the first member and second member are in a first rest position. When the first and second members are in the first position, the container can be tilted, moving the support portions from the supporting surface, whereby the container is supported on the wheel means. The first member and second member can be moved to a second transport position whereby the container is supported by the wheel means.

IN THE DRAWING

FIG. 1 is a side elevational view of a tool box equipped with a two-wheel truck according to the invention showing the truck in its rest position;

FIG. 2 is a bottom plan view of the tool box and truck of FIG. 1;

FIG. 3 is an enlarged sectional view taken along line 3—3 of FIG. 1;

FIG. 4 is a side elevational view of the tool box and truck showing a first transport position of the truck and tool box; and FIG. 5 is a side elevational view of the tool box and truck showing a second transport position of the truck and tool box.

Referring to the drawing, there is shown in FIGS. 1 and 2 an object indicated generally at 10, shown as a container or tool box, in assembled relation with a wheeled truck indicated generally at 11. The container 10 is a conventional tool box or tool chest used by carpenters, electricians, plumbers, steam fitters, and like tradesmen. An example of the size of the tool box is a box having a width and depth of approximately 9 inches and a length of 30 inches. Other types and sizes of boxes, containers or similar objects can be used with the truck 11. The box 10 has upright elongated side walls 12 secured to end walls 13 and 14. A handle 16 is pivotally mounted on end wall 13. In similar manner, a handle 17 is pivotally mounted on end wall 14. The end and side walls are joined to a bottom 18 to form the container. The top of the box is closed with a cover 19 having a central handle 21. Latches 22 cooperate with hinges (not shown) to retain the cover 19 in a closed position.

The truck 11 has two substantially identical side frame members indicated generally at 23 and 24. The following description is limited to side member 23. The corresponding parts of side member 24 are indicated with the same reference numeral having the suffix A. Side frame member 23 has a generally flat central body 26. Located along the lower side of the body 26 is a straight bottom supporting edge 27 which linearally rests on a supporting surface or floor 28. The upper end of body 26 has an upwardly and outwardly directed arm 29 located adjacent the side wall 12 of the container. Arm 29 projects upwardly at an angle of 45° with respect to the bottom edge 27 of the body 26. The opposite end of the body 26 has a lower arm 31. The arm 31 projects upwardly at an angle with respect to the horizontal plane. The angle is approximately 30° with respect to the straight bottom edge 27 of the body 26.

The upper portion of arm 29 is movably connected to an end portion of the box side wall 12 with a pivot 32. As shown in FIG. 3, pivot 32 comprises a bolt 33 projected through a hole 34 through the side wall 12 and in hole 35 of the arm 29. Washers 36 and 37 are located on opposite sides of the side wall 12 to provide side supports. A nut 38 fixedly mounts the bolt 33 on the side wall 12. Washers 39 and 41 are located on opposite sides of the arm 29 to provide side bearings for the nut 42 used to hold the arm 29 in pivotal relation with the bolt 33. The arm 24 is pivotally mounted on the opposite side wall of the tool box with a similar pivot 32A. The pivot 32 is axially aligned with pivot 32A so that the frame members 23 and 24 pivot about the same transverse axis.

Bodies 26 and 26A of the side frame members are secured together with a cross plate or member 43 which extends under the tool box 10. Cross plate 43 has diverging or angularly related side edges 44 and 46 in surface engagement with the inside faces of bodies 26 and 26A respectively. First nut and bolt assemblies 47 secure the body 26 to the plate 43. In a similar manner, second nut and bolt assemblies 48 secure the body 26A to the plate 43. The inclined side edges 44 and 46 position the side frame members at a slight taper or angle relative to the longitudinal center line of the truck. The side frame members diverge outwardly from the pivots 32 and 32A, as shown in FIG. 2.

The cross plate 43 has a linear upper transverse edge 49 which extends substantially parallel to the pivot axis of the frame members. The edge 49 functions as a top to limit the pivotal movement of the frame members relative to the container. As shown in FIG. 5, the edge 49 is engaged with the bottom 18 of the tool box adjacent the end wall 14 when the truck is in a transport position.

As shown in FIG. 2, the lower arms 31 and 31A are connected together with a transverse rod or member 51. A first pair of nuts 52 and 53 threaded on the rod function as inside stops for the arms 31 and 31A. Rotatably mounted on portions of the rod 51 that project outwardly from arms 31 and 31A are wheels 54 and 56. Retainers 57 and 58, as double nuts, cotter keys, flanged grip nuts and the like, on the ends of rod 51 hold wheels 54 and 56 in rotating assembled relation with the rod 51. As shown in FIG. 1, when the bottom supporting edge 27 of the body 26 rests on the support surface 28, the wheels 54 and 56 do not engage the support surface 28. The tool box 10 is connected to the truck through pivots 32 and 32A and rests on the rod 51. With the wheels 54 and 56 spaced from the supporting surface, the tool box and truck are not free to move. Thus the tool box will remain in a fixed rest location when it is supported on the truck, as shown in FIG. 1.

In use it is at times desirable to move the tool box 10 a short distance to a new and more convenient location relative to the job. The workman can lift one end of the tool box with his hand 59, as shown in FIG. 4, through use of the handle 17. The side frame members 23 and 24 will be raised from the supporting surface. The wheels 54 and 56 will engage the supporting surface and thus provide a convenient manner of moving the tool box with a minimum of effort.

When the tool box tends to be moved relatively long distances, it is desirable to raise the elevation of the tool box 10 and tow the tool box 10. This is accomplished by pivoting or swinging the frame members 23 and 24 to a generally upright transport position, as shown in FIG. 5. The side frame members 23 and 24 will pivot rearwardly until the upper transverse edge 49 of the cross plate 43 engages the bottom wall 18. The point of engagement of the edge 49 with the bottom wall 18 is substantially rearwardly of the pivots 32 and 32A whereby the pivotal axis of the wheels 54 and 56 is rearward of the pivots 32 and 32A. Thus, the truck is in an over center which prevents the side frame members 23 and 24 from pivoting back to the forward first rest position, as shown in FIG. 1. When the tool box and truck have been towed to the desired location, the truck 11 is then pivoted back to its forward position whereby the truck 11 is located in a compact and convenient location under the bottom wall 18 of the tool box 10.

The above description is directed to one embodiment of the invention. It is understood that changes in the shape, materials and size may be made by those skilled in the art without departing from the spirit of the invention. For example, the truck can be made of one piece of metal wherein the side frame members and the cross plate are formed from a single blank. The side members and cross plate can be made from wood, plastic or similar rigid construction materials.

The embodiments of the invention in which an exclusive property or privilege is claimed are defined as follows:

1. A truck for an object having spaced side walls and a bottom wall to facilitate movement of the object on a supporting surface and support the object on the supporting surface comprising: a first side member, a second side member laterally spaced from the first side member, each side member having a length shorter than the length of the object, a first end portion, a second end portion, and a body connecting said end portions, said first end portion of the first side member positionable adjacent one side wall of the object, said first end portion of the second side member positionable adjacent the other side wall of the object, wheel means rotatably mounted on the second end portions of the side members, means for pivotally connecting said first end portions to said side walls of the object whereby the side member can be selectively located in a first folded position adjacent the bottom wall of the object wherein the bodies support the object directly on the supporting surface with said wheel means positioned spacedly above said supporting surface and a second generally upright position wherein the wheel means support the object on the supporting surface, a cross member extended between and secured to said first and second side members, said cross member having an upper portion engageable with the bottom wall of the object when the side members are in the upright position to limit pivotal movement of the side members relative to the object in one direction and permitting pivotal movement of the side members from the upright position to the folded position, and means connected to the second end portions for supporting one end of the object when the side members are in the folded position.

2. The truck of claim 1 wherein: the body of each side member has generally parallel linear support portions engageable with the supporting surface when the side members are in the folded position.

3. The truck of claim 1 wherein: the body of each side member has an elongated bottom edge, and said first end portion and said second end portion project upwardly and outwardly from said edge.

4. The truck of claim 1 wherein: the means connected to the second end portions comprise a rod extended between and mounted on the second end portions.

5. The truck of claim 1 wherein: the first side member and the second side member diverge relative to each other from the first end portions thereof.

6. The truck of claim 1 wherein: the means connected to the second end portions comprise a rod extended between and mounted on the second end portions, said rod having end means rotatably accommodating said wheel means.

* * * * *